(12) United States Patent
Song et al.

(10) Patent No.: US 7,163,224 B1
(45) Date of Patent: Jan. 16, 2007

(54) MOTORCYCLE HANDLEBAR MOUNTING ASSEMBLY

(75) Inventors: Michael M. Song, Maple Grove, MN (US); David A. Swan, Forest Lake, MN (US)

(73) Assignee: Polaris Industries, Inc., Medina, MN (US)

( * ) Notice: Subject to any disclaimer, the term of this patent is extended or adjusted under 35 U.S.C. 154(b) by 19 days.

(21) Appl. No.: 10/725,356

(22) Filed: Dec. 1, 2003

Related U.S. Application Data

(63) Continuation of application No. 10/612,278, filed on Jul. 1, 2003, now abandoned.

(51) Int. Cl.
*B62K 21/18* (2006.01)

(52) U.S. Cl. ...................... 280/276; 74/551.1; 280/279

(58) Field of Classification Search ................ 280/279, 280/280, 288.4; 403/373; 74/551.1, 551.2, 74/551.3, 551.4, 551.5, 551.6, 551.7, 551.8
See application file for complete search history.

(56) References Cited

U.S. PATENT DOCUMENTS

| | | | |
|---|---|---|---|
| 3,655,219 A | 4/1972 | Jacoby | |
| 4,043,684 A * | 8/1977 | Lacroix | 403/8 |
| 4,323,263 A | 4/1982 | Cook et al. | |
| 4,337,962 A * | 7/1982 | Allen et al. | 280/279 |
| 4,753,448 A * | 6/1988 | Nagashima | 280/264 |
| 4,794,815 A * | 1/1989 | Borromeo | 74/551.1 |
| 5,464,634 A * | 11/1995 | Kossovsky et al. | 424/493 |
| 5,678,458 A | 10/1997 | Kao | |
| 5,755,141 A * | 5/1998 | Chen | 74/551.3 |
| 5,779,253 A * | 7/1998 | Lee | 280/279 |
| 5,881,606 A * | 3/1999 | Roddy | 74/551.3 |
| 6,035,741 A | 3/2000 | Krizman, Jr. | |
| 6,058,800 A | 5/2000 | Giard | |
| 6,122,991 A | 9/2000 | Clarkson | |
| 6,176,339 B1 | 1/2001 | Reichardt | |
| 6,176,503 B1 | 1/2001 | George | |
| 6,186,027 B1 | 2/2001 | Nielsen | |
| 6,234,506 B1 | 5/2001 | Li | |
| 6,688,175 B1 * | 2/2004 | Ogura et al. | 73/493 |
| 6,712,541 B1 * | 3/2004 | Henricksen | 403/344 |

FOREIGN PATENT DOCUMENTS

JP            3-213483        * 9/1991

* cited by examiner

*Primary Examiner*—Anne Marie Boehler
(74) *Attorney, Agent, or Firm*—Baker & Daniels LLP

(57) ABSTRACT

The invention provides an apparatus and method for providing a riser tube and a riser cap, which when operatively coupled, involve all fasteners providing the coupling to be only visible from an underside of the riser tube.

17 Claims, 5 Drawing Sheets

MOTORCYCLE HANDLEBAR MOUNTING ASSEMBLY

This is a Continuation of application Ser. No. 10/612,278 filed Jul. 1, 2003 now abandoned. The entire disclosure of the prior application is considered as being part of the disclosure of this application and is hereby incorporated by reference herein.

TECHNICAL FIELD

The invention relates to attachment devices utilized for coupling a handlebar to a steering mechanism of a vehicle, and in particular, the invention relates to a handlebar mounting assembly that includes riser tubes and riser caps.

BACKGROUND OF THE INVENTION

It is believed that motorcycle owners typically place a premium on the aesthetic appearance of their motorcycles. In light of this, motorcycle manufacturers generally tend to shy away from motorcycle designs that require anything to be fixedly attached thereon (i.e., in plain view) which takes away (i.e., stands out) from the overall guise or exterior look of the cycle. The reasoning lies in the belief that such designs may be negatively received by the public, resulting in less consumer demand for such motorcycles. This concern is of particular importance in reference to the front portion of the motorcycle, as the front portion is always within plain view of a rider whenever he or she is operating the motorcycle. A component located on the front portion of the motorcycle that is in plain view includes one or more fasteners used to couple one or more riser caps to adjoining riser tubes.

Upper portions of each of the one or more fasteners used in coupling the one or more riser caps to the adjoining riser tubes generally need to be in contact with, and in turn, visible on the upper surface of the riser caps in order for the fasteners to function as intended, namely to couple the riser tubes to the riser caps and thereby, to secure a handlebar therebetween. By being utilized in this fashion, each fastener is clearly in plain view of the rider. Since these fasteners are generally small in size, the degree to which the fasteners stand out to the rider may be questionable. However, by their very location on the motorcycle, the fasteners are generally susceptible to contact with environmental elements (e.g., rain, dirt, etc.). With this, the fasteners are also susceptible to corrosion, discoloring, blemishing, etc. brought on by their contact with the environmental elements. This susceptibility to corrosion, discoloring, blemishing, etc. would make the fasteners much more likely to stand out, and typically less aesthetically pleasing to the consumer.

SUMMARY OF THE INVENTION

According to a first aspect of the invention, there is provided a motorcycle. The motorcycle comprises a frame, a steering fork, a lower triple clamp and an upper triple clamp, a fastener assembly, one or more riser tubes, and a handlebar. The frame has a head tube and the steering fork has a pair of fork tubes. The lower triple clamp and the upper triple clamp are rotatably coupled to the head tube, and operatively coupled to the pair of fork tubes such that the steering fork rotates relative to the frame. The fastener assembly is adapted to rotatably couple the head tube to the upper and lower triple clamps. Each of the one or more riser tubes has an upper surface and a lower surface. The lower surface of each riser tube is operatively coupled to the upper triple clamp. The upper surface of each riser tube is operatively coupled to a riser cap. The riser tube and the riser cap are adapted so that the coupling therebetween involves one or more fasteners being visible only from an underside of the riser tube. The handlebar has a portion thereof located between each riser tube and riser cap.

According to a second aspect of the invention, there is provided a handlebar mounting assembly. The assembly comprises one or more riser tubes, one or more riser caps, and one or more fasteners. The one or more riser tubes each has an upper surface, a first recess defined in the upper surface, and one or more bores extending through the upper surface. The first recess is dimensioned to conform to a first portion of an exterior surface of the handlebar. The one or more riser caps each has a lower surface and a smooth upper surface. Each of the riser caps has a second recess defined in the lower surface and one or more bosses located in the lower surface. The second recess is dimensioned to conform to a second portion of the exterior surface of the handlebar. The one or more fasteners extend through the one or more bores of the one or more riser tubes into the one or more bosses of the one or more riser caps. The one or more fasteners are adapted to secure the one or more riser caps to the one or more riser tubes and adapted to accommodate and secure an external surface portion of the handlebar between the one or more riser tubes and the one or more riser caps.

According to a third aspect of the invention, there is provided a method of concealing one or more fasteners adapted to couple an upper surface of a riser tube to a riser cap such that the one or more fasteners are only visible from an underside of the riser tube. The method involves providing a motorcycle and removing one or more first riser caps and one or more first riser having been adjoined to the one or more caps from the motorcycle. A second riser tube and a second riser cap are provided. The second riser tube and the second riser cap are adapted so that the coupling therebetween involves one or more fasteners being only visible from an underside of the second riser tube. The second riser tube is secured to the motorcycle and the second riser cap is secured to the second riser tube of the motorcycle.

DETAILED DESCRIPTION OF PREFERRED EMBODIMENTS OF THE INVENTION

Figure 1:
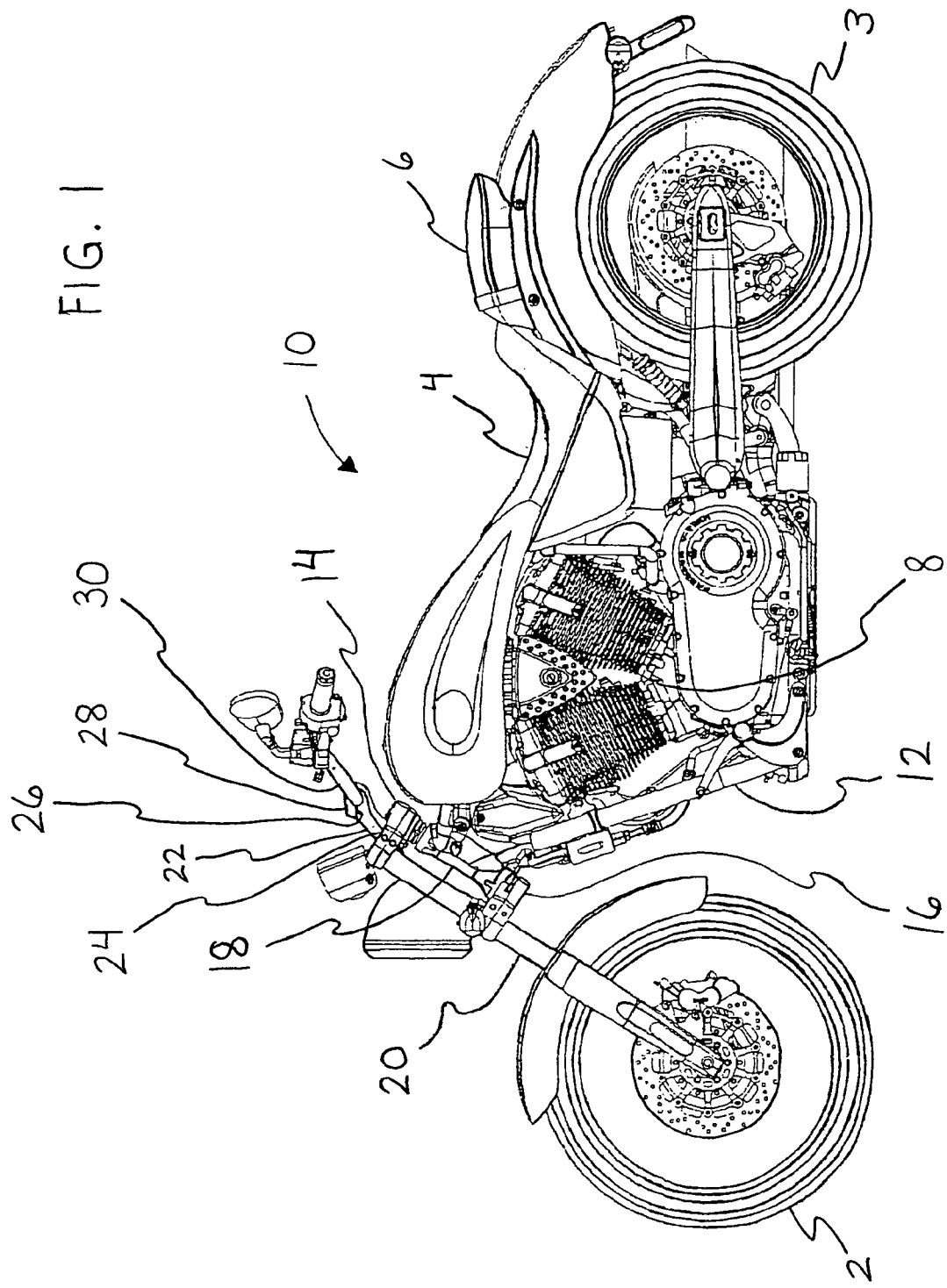
FIG. 1 is a schematic side elevation view of a motorcycle in accordance with certain embodiments of the invention.

The following detailed description is to be read with reference to the drawings, in which like elements in different figures have like reference numerals. The drawings, which are not necessarily to scale, depict selected embodiments, but are not intended to limit the scope of the invention. It will be understood that many of the specific details of the vehicle incorporating the system illustrated in the drawings could be changed or modified by one of ordinary skill in the art without departing significantly from the spirit of the invention. The riser tube and riser cap of the invention are designed for use on vehicles such as motorcycles, however, they may be used on other vehicles such as mopeds, scooters, bicycles, all-terrain vehicles, and the like.

FIG. 1 shows a side elevation view of a motorcycle 10 in accordance with certain embodiments of the invention. The motorcycle 10 has a front wheel 2, a rear wheel 3, a driver seat 4, a passenger seat 6, an engine 8, and a frame 12. The motorcycle 10 also has an upper triple clamp 14 and a lower triple clamp 16, which are respectively positioned above and below a head tube 18 of the frame 12 of the motorcycle 10. A fastener assembly (not shown) is used to secure the triple clamps 14, 16 to the head tube 18, while the triple clamps 14, 16 are operatively connected to a pair of fork tubes 20 (only one of which is visible in FIG. 1), which generally make up a steering fork of the motorcycle 10. The fastener assembly typically includes a steering stem and nut, however, it is contemplated that the fastener assembly could alternatively include other retaining mechanisms. With the coupling to the steering fork and a rotatable coupling to the head tube 18, the upper and lower triple clamps 14, 16 enable the steering fork to be rotated with respect to the frame 12 of the motorcycle 10.

One or more riser tubes 22 and one or more adjoining riser caps 28 are generally used on the motorcycle 10 to operatively couple a handlebar 30 to the steering fork of the motorcycle 10. As shown in FIG. 1, each of the riser tubes 22 (only one is visible) has a lower surface 24 operatively coupled to the upper triple clamp 14 and an upper surface 26 operatively coupled to the riser cap 28. Secured between the upper surface 26 of each riser tube 22 and the corresponding riser cap 28 is the handlebar 30. With the coupling to the upper triple clamp 14 and to the riser cap 28, each of the riser tubes 22 facilitates the rotation of the steering fork as a result of rotating the handlebar 30 secured between each of the one or more riser tubes 22 and riser caps 28.

Figure 2:
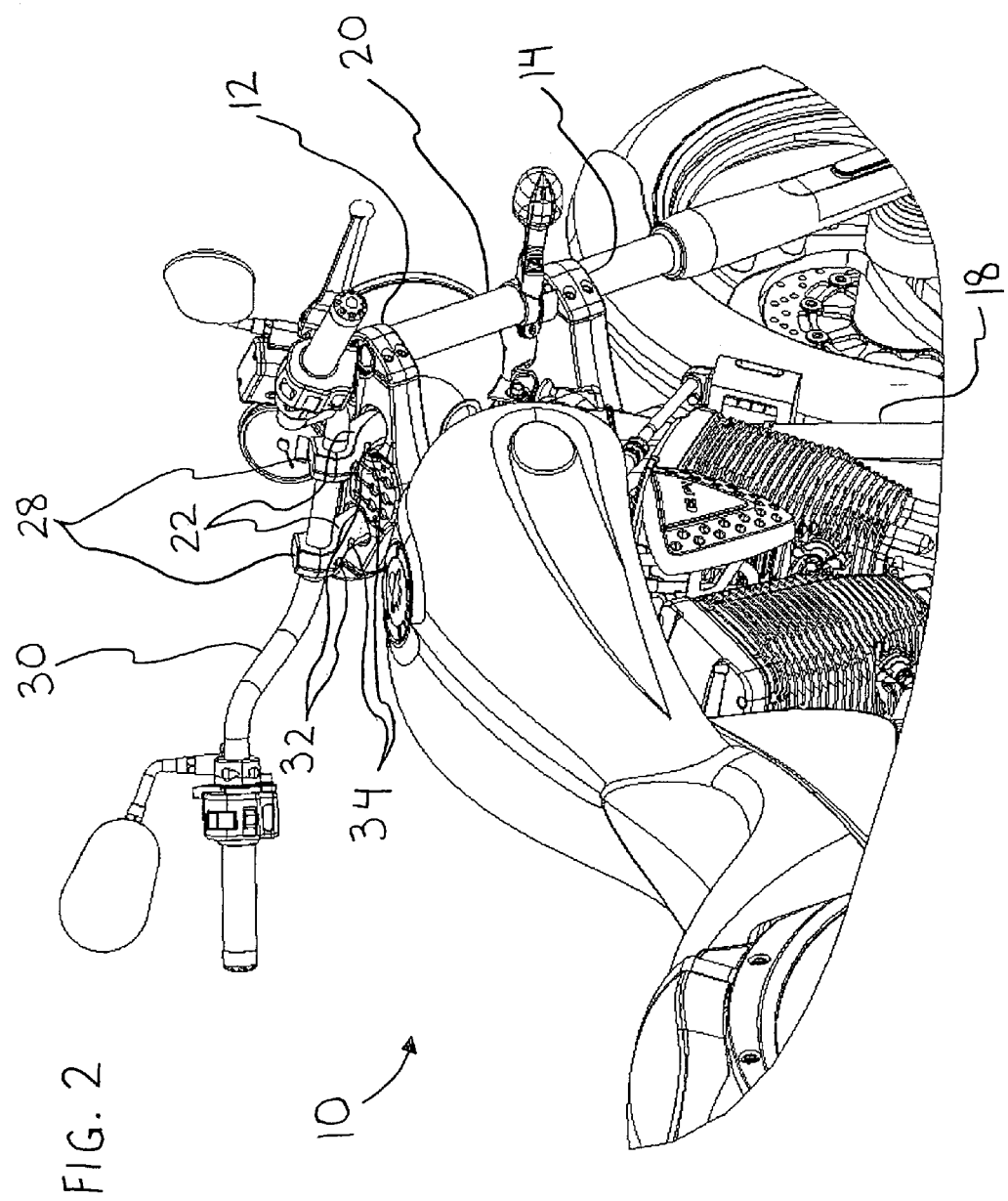
FIG. 2 is a schematic, side perspective view of an upper front portion of the motorcycle of FIG. 1.

FIG. 2 illustrates a side perspective view of an upper front portion of the motorcycle 10 of FIG. 1. A pair of riser tubes 22 and corresponding riser caps 28 are illustrated, with each of the tubes 22 being coupled to one of the caps 28 to secure a portion of the handlebar 30 therebetween. Each of the riser tubes 22 has an underside portion that is exposed to the operator. Each of these exposed riser tube underside portions includes a first bore 32 and a second bore 34. In contrast, portions of the riser caps 28 exposed to an operator or consumer are smooth, i.e., without bores or indentations. The first and second bores 32 and 34 on the exposed side portion of each of the riser tubes 22 are respectively sized to receive first and second fasteners (shown in FIG. 3) in securing each riser tube 22 to each riser cap 28. Additionally, while the coupling of the riser tubes 22 and riser caps 28 functions in securing portions of the handlebar 30, there is no contact between the fasteners (that couple the riser tubes 22 to the riser caps 28) and the handlebar 30 (shown in FIG. 4).

While certain embodiments mentioned above describe using two riser tubes and two corresponding riser caps on a motorcycle, it is contemplated that other embodiments may use one or more than two riser tubes and one or more than two adjoining riser caps. Further, it is contemplated that other embodiments may use one or more than two bores and one or more than two corresponding fasteners in coupling each riser tube and riser cap together. While two riser tubes and riser caps are described herein with each riser tube having two bores and two corresponding fasteners to be received within the bores, it is not done to limit the applicability of the invention as such. It is fully contemplated that different quantities of riser tubes and riser caps, as well as different quantities of bores in each riser tube may be utilized without departing from the spirit of the invention. In addition, each riser tube and riser cap could include multiple components assembled together surrounding the handlebar.

Figure 3:
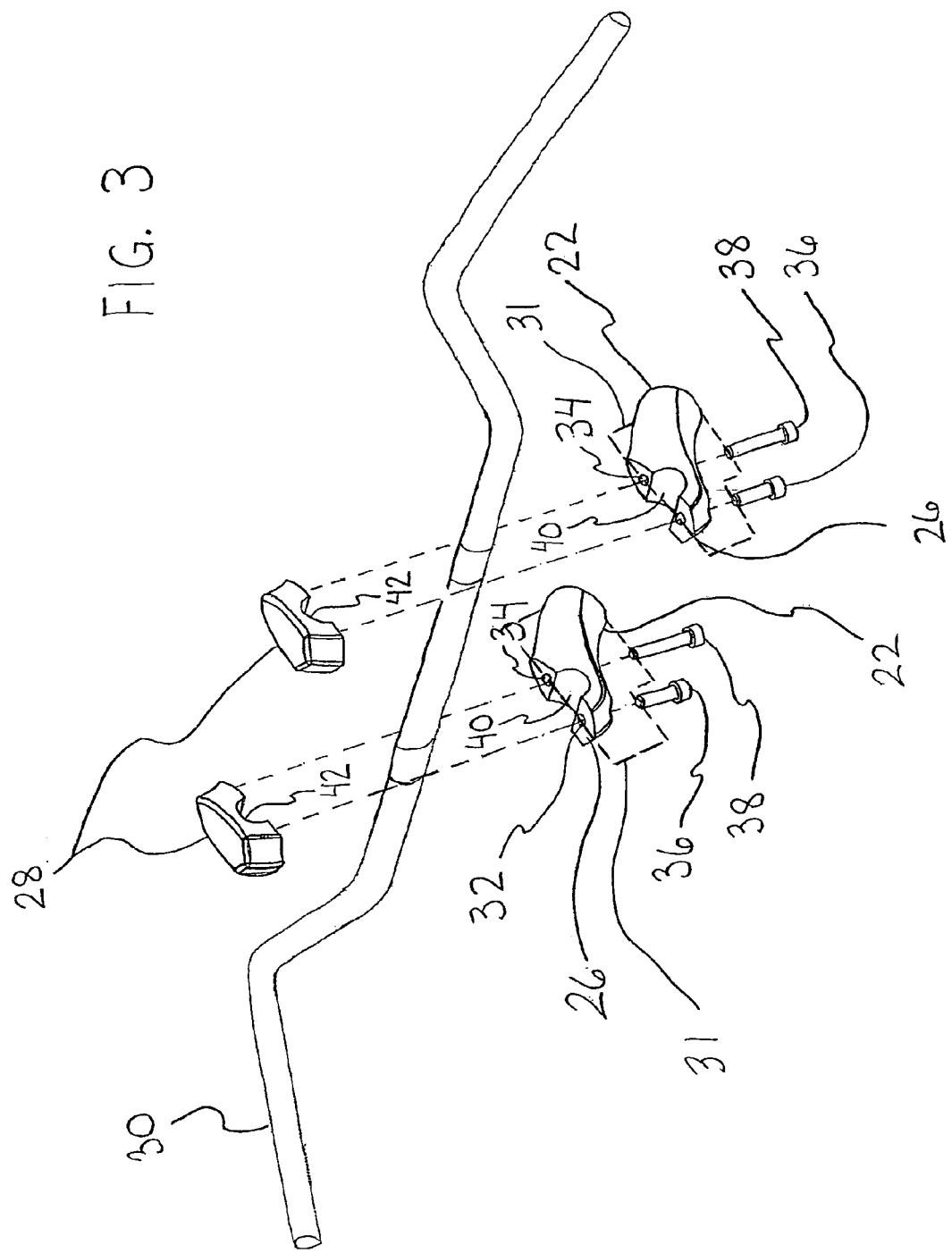
FIG. 3 is a schematic, exploded side perspective view of an assembly involving a pair of riser tubes being coupled to a pair of riser caps, with a handlebar located therebetween in accordance with certain embodiments of the invention.

FIG. 3 shows an exploded side perspective view of a handlebar mounting assembly including a pair of riser tubes 22 and a pair of riser caps 28, with a handlebar 30 located therebetween in accordance with an embodiment of the invention. The assembly includes two riser tubes 22, two riser caps 28, a handlebar 30, two first fasteners 36, and two second fasteners 38. The upper surface 26 of each of the riser tubes 22 defines a first recess 40 and a lower surface of each of the riser caps 28 defines a second recess 42. Each of the first and second recesses 40, 42 function separately to conform to different exterior surface portions of the handlebar 30. Each of the recesses 40, 42 function together to form a cavity that accommodates the exterior surface portion of the handlebar 30 when the riser tubes 22 and the riser caps 28 are coupled together. As such, each of the recesses 40, 42 defines an equal portion of the cavity. Alternatively, each of the riser tubes 22 may have a large enough cavity to accommodate the handlebar 30, while each riser cap 28 would have a smaller cavity or no cavity at all. In contrast, each of the riser tubes 22 may have a small cavity or no cavity at all, while each riser cap 28 would have a large enough cavity to accommodate the handlebar 30.

As mentioned above, the riser tubes 22 and the riser caps 28 are coupled using first and second fasteners 36 and 38 respectively. As shown, the fasteners 36, 38 of each riser tube 22 are aligned along a vertical plane 31 centered within the riser tube 22, in which the vertical plane 31 runs front to back through the riser tube 22. In certain preferable embodiments of the invention, the first and second fasteners 36 and 38 are threaded bolts, in which the first fasteners 36 are shorter in length than the second fasteners 38. It should be appreciated that the fasteners 36, 38 could be retainers other than bolts, and the first fasteners 36 could very well be longer or the same size as the second fasteners 38 without departing from the spirit of the invention. As described above, each riser tube 22 defines first and second bores, 32 and 34 respectively. Preferably, each of the first bores 32 is adapted to accept one of the first fasteners 36, and each of the second bores 34 is adapted to accept one of the second fasteners 38. Further, each riser cap 28 defines first and second bosses (not shown) that respectively align with the first and second bores 32 and 34 of each corresponding riser tube 22. Thus, when the riser tubes 22 are coupled to corresponding riser caps 28, the first and second fasteners 36 and 38 can respectively extend through the first and second bores 32 and 34 of the riser tubes 22 and be received within the first and second bosses of the riser caps 28 to secure the riser caps 28 to the riser tubes 22, and thus, the handlebar 30 between the riser tubes 22 and riser caps 28.

Figure 4:
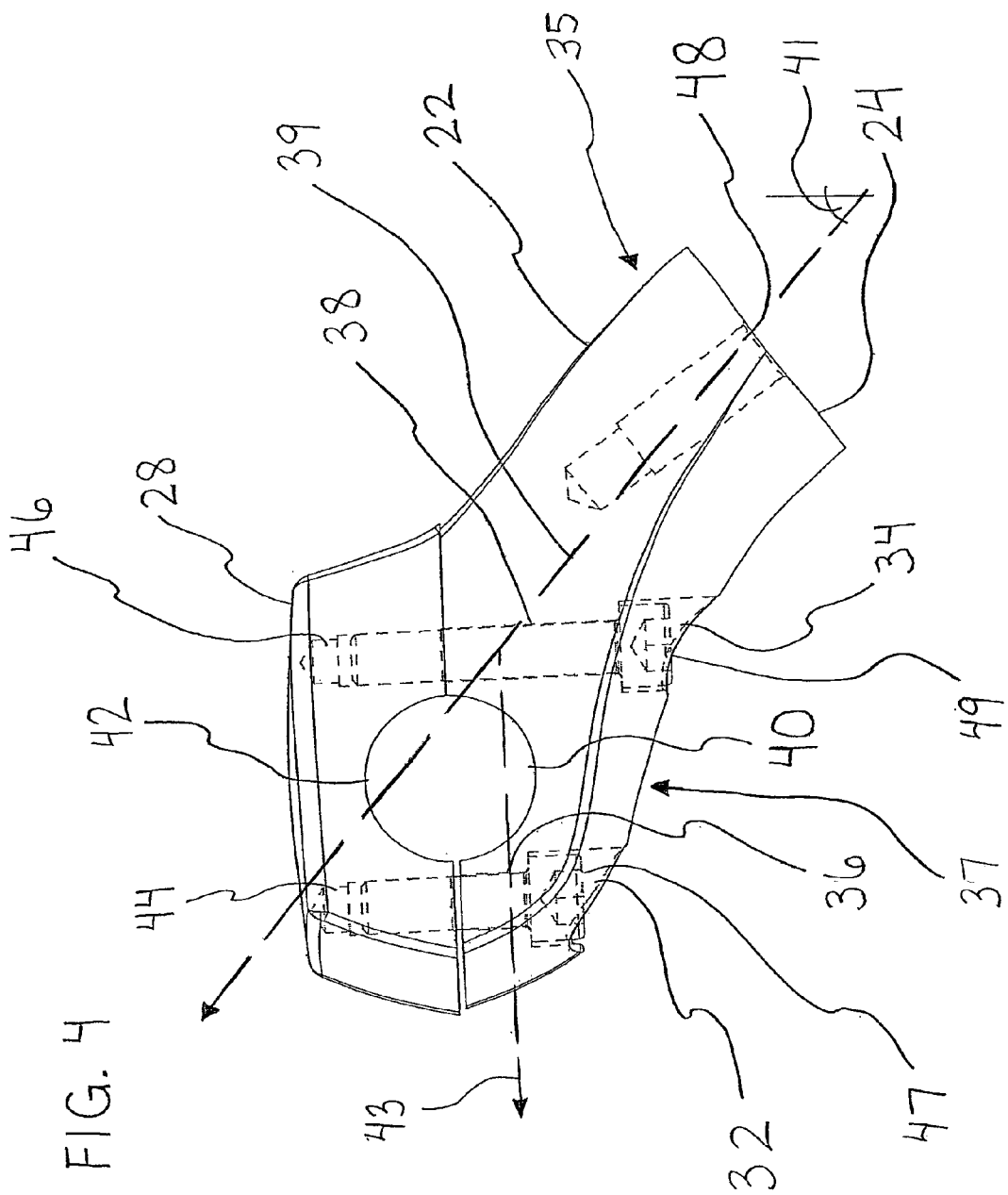
FIG. 4 is a schematic, side elevation view of an assembly of a riser tube and a riser cap in accordance with certain embodiments of the invention.

FIG. 4 illustrates a side elevation view of an assembly of one riser tube 22 and one riser cap 28 in accordance with an embodiment of the invention. As shown, the riser tube 22 includes a base end 35 and an extension end 37. As such, the base end 35 extends in a first direction 39, which is rearward and generally upward. The first direction 39 is therefore at an angle 41 from vertical. The extension end 37 extends in a second direction 43 outward from the base end 35 of the riser tube 22. The second direction is rearward and generally horizontal as shown in FIG. 4. As shown, a clearance area is provided below the riser tube 22 sufficient for removal of the first and second fasteners 36 and 38 without contacting the upper triple clamp (not shown). As shown, when the riser tube 22 and the riser cap 28 are coupled, the first and second bores 32 and 34 in the riser tube 22 are respectively aligned with the first and second bosses 44 and 46 in the riser cap 28. In turn, each of the first and second fasteners 36 and 38 can be respectively inserted through the first and second bores 32 and 34 of the riser tube 22. As shown, once inserted, the first and second fasteners 36 and 38 have respective portions 47 and 49 visible only from an underside of the riser tube. The visible portions 47, 49 are recessed within the riser tube 22 and are at least partially aligned with the bottom surface of the riser tube 22. Further, each of the first and second fasteners 36 and 38 will be respectively received by the first and second bosses 44 and 46 of the riser cap 28. Preferably, the bosses 44, 46 of the riser cap have inner threading in order to receive and secure the threaded portions of the corresponding fasteners 36, 38. In addition, when the riser tube 22 and riser cap 28 are coupled, the first recess 40 in the riser tube 22 and the second recess 42 in the riser cap 28 align to create a cavity sized to accommodate and secure an external surface portion of the handlebar 30. Finally, there are one or more bosses 48 located in the lower end 24 of the riser tube 22 utilized in the coupling of the riser tube 22 to the upper triple clamp 14 of the motorcycle 10. Preferably, the one or more bosses 48 each have inner threading.

Figure 5:
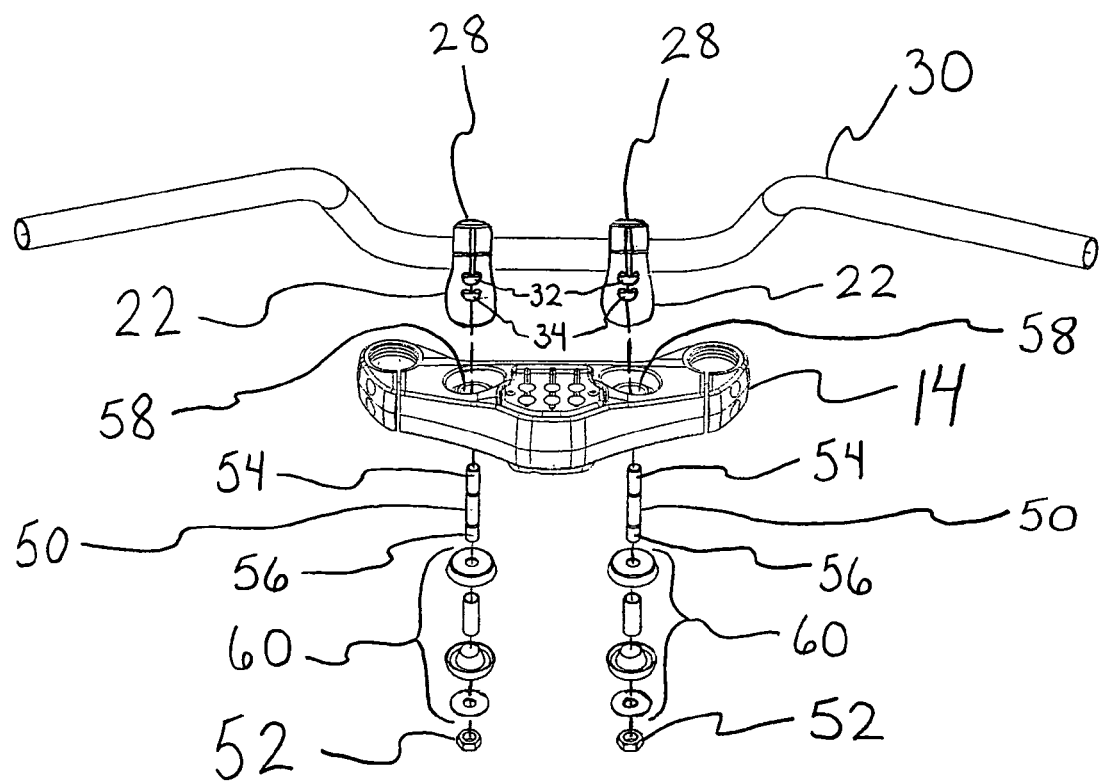
FIG. 5 is a schematic, exploded rear perspective view of an assembly involving a pair of riser tubes and an upper triple clamp in accordance with certain embodiments of the invention.

FIG. 5 shows an exploded rear perspective view of an assembly involving a pair of riser tubes 22 being coupled to an upper triple clamp 14 in accordance with an embodiment of the invention. The assembly includes two riser tubes 22 (both coupled to corresponding riser caps 28 with the handlebar 30 secured therebetween), an upper triple clamp 12, two rods 50, and two nuts 52 in accordance with certain embodiments of the invention. In certain preferable embodiments, each rod 50 has threaded upper and lower ends, 54 and 56 respectively, and each nut 52 has inner threading. As such, the upper threaded end 54 of each rod 50 can be received and secured within the threaded boss 48 (shown in FIG. 4) in the lower end 24 of the corresponding riser tube 22. As shown, the rods 50 extend through corresponding apertures 58 within the upper triple clamp 12. The lower threaded end 56 of each rod 50 can then receive additional hardware 60 as shown, along with each nut 52, which can be threadably received and secured on the lower threaded end 56.

While embodiments of the present invention have been described, it should be understood that various changes, adaptations, and modifications may be made therein without departing from the spirit of the invention and the scope of the appended claims.

What is claimed is:

1. A motorcycle comprising:
   a frame having a head tube;
   a steering fork having a pair of fork tubes;
   a lower triple clamp and an upper triple clamp rotatably coupled to the head tube and operatively coupled to the pair of fork tubes such that the steering fork rotates relative to the frame;
   a fastener assembly adapted to rotatably couple the head tube to the upper and lower triple clamps;
   one or more riser tubes each having an upper surface and a lower surface, the lower surface of each riser tube operatively coupled to the upper triple clamp and the upper surface of each riser tube operatively coupled to a riser cap, the riser tube and the riser cap coupled together by at least two fasteners visible only from an underside of the riser tube, each riser tube including a base end and an extension end, each base end extending in a first direction, the first direction being at an angle from vertical, the extension end extending in a second direction outward from the base end of each riser tube; and
   a handlebar having a portion thereof located between each riser tube and riser cap.

2. The motorcycle of claim 1, wherein each of the fasteners comprises a threaded bolt.

3. The motorcycle of claim 1, wherein the upper surface of each riser tube has one or more bores.

4. The motorcycle of claim 3, wherein a lower surface of the riser cap comprises one or more bosses having inner threading.

5. The motorcycle of claim 4, wherein each bore is adapted to align with one of the threaded bosses on the lower surface of the riser cap.

6. The motorcycle of claim 5, wherein each fastener is adapted to extend through one of the bores and to be received by one of the bosses.

7. The motorcycle of claim 1, wherein the handlebar is free from direct contact with the fasteners.

8. The motorcycle of claim 1, wherein the upper end of each of the one or more riser tubes comprises a first recess.

9. The motorcycle of claim 8, wherein a lower surface of each of the one or more riser caps comprises a second recess.

10. The motorcycle of claim 9, wherein a cavity sized to accommodate and secure the handlebar is comprised from the combination of the first and second recesses when each of the one or more riser tubes and the one or more riser caps is coupled.

11. The motorcycle of claim 10, wherein each of the first and second recesses define an equal portion of the cavity.

12. The motorcycle of claim 1, wherein one or more of the first direction and the second direction comprise a rearward direction with respect to the motorcycle.

13. The motorcycle of claim 1, wherein the first direction is generally upward.

14. The motorcycle of claim 1, wherein the second direction is generally horizontal.

15. The motorcycle of claim 1, wherein the fasteners of each riser tube are aligned along a vertical plane centered within each riser tube, the vertical plane running front to back through each riser tube.

16. A handlebar mounting assembly comprising:
   one or more riser tubes each having an upper surface, each of the riser tubes having a first recess defined in the upper surface and one or more bores extending through the upper surface, the first recess dimensioned to conform to a first portion of an exterior surface of the handlebar, each riser tube including a base end and an extension end, each base end extending in a first direction, the first direction being at an angle from vertical, the extension end extending in a second direction outward from the base end of each riser tube;
   one or more riser caps each having a lower surface and a smooth upper surface, each of the riser caps having a second recess defined in the lower surface and one or more bosses located in the lower surface, the second recess dimensioned to conform to a second portion of the exterior surface of the handlebar; and
   at least two fasteners extending through the one or more bores of the one or more riser tubes into the one or more bosses of the one or more riser caps, the fasteners securing the one or more riser caps to the one or more riser tubes and adapted to accommodate and secure an external surface portion of the handlebar between the one or more riser tubes and the one or more riser caps.

17. The assembly of claim 16, wherein each of the first and second recesses define an equal portion of a cavity that accommodates the handlebar.

* * * * *